US009125383B1

(12) United States Patent
Yim

(10) Patent No.: US 9,125,383 B1
(45) Date of Patent: Sep. 8, 2015

(54) AQUARIUM ACCLIMATION DEVICE

(76) Inventor: Steven Yim, La Habra, CA (US)

(*) Notice: Subject to any disclaimer, the term of this patent is extended or adjusted under 35 U.S.C. 154(b) by 29 days.

(21) Appl. No.: 13/585,582

(22) Filed: Aug. 14, 2012

(51) Int. Cl.
*A01K 63/00* (2006.01)
*A01K 63/04* (2006.01)
*A01K 61/00* (2006.01)

(52) U.S. Cl.
CPC ............ *A01K 63/00* (2013.01); *A01K 63/04* (2013.01); *A01K 61/00* (2013.01)

(58) Field of Classification Search
CPC .... A61K 2300/00; A01K 61/00; A01K 63/04
USPC .......... 119/215, 211, 225, 226, 217, 218, 264
See application file for complete search history.

(56) References Cited

U.S. PATENT DOCUMENTS

| | | | | |
|---|---|---|---|---|
| 2,636,473 A * | 4/1953 | Schwartz et al. | ............. | 119/264 |
| 3,485,373 A * | 12/1969 | Powers | .................... | 210/167.27 |
| 3,491,722 A * | 1/1970 | Levitov et al. | ................ | 119/251 |
| 4,188,909 A * | 2/1980 | Spivak | ........................... | 119/251 |
| 4,957,623 A * | 9/1990 | Henzlik | ................... | 210/167.23 |
| 5,279,730 A * | 1/1994 | Chen | ........................ | 210/167.23 |
| 5,779,884 A * | 7/1998 | Raymo | ........................... | 210/97 |
| 6,640,749 B1 * | 11/2003 | Monnier | ...................... | 119/203 |
| 8,156,898 B2 * | 4/2012 | Luong et al. | .................... | 119/251 |
| 8,347,820 B2 * | 1/2013 | Sigmon et al. | ................. | 119/259 |
| 8,720,377 B1 * | 5/2014 | McLean | ........................ | 119/251 |
| 2007/0068857 A1 * | 3/2007 | Davison | ................... | 210/167.21 |
| 2007/0227459 A1 | 10/2007 | Gould | | |
| 2009/0247964 A1 * | 10/2009 | Kitani et al. | .................. | 604/250 |

* cited by examiner

*Primary Examiner* — Monica Williams
*Assistant Examiner* — Jessica Wong
(74) *Attorney, Agent, or Firm* — Kenneth L. Green; Averill & Green

(57) ABSTRACT

An aquarium acclimation device and method reduce stress and shock which may occur during transition of marine livestock including fish, invertebrates, corals, etc., from a store, online, or wholesaler, to an owner's aquarium. The acclimation device includes tubing, a squeeze bulb, a drip counter, and a rolling clamp. A "J" tube is hung over an edge of the aquarium with one end reaching into water in the aquarium and an opposite end hanging outside the aquarium. The squeeze bulb is connected to the outside end of the "J" tube for initiation of a flow of the aquarium water from the aquarium and a clear squeeze bulb may further provide the drip counter. The rolling clamp and drip counter allow a gradual, observable, and controlled flow for a gradual controlled transition to the aquarium environment.

19 Claims, 4 Drawing Sheets

AQUARIUM ACCLIMATION DEVICE

The present invention relates to aquariums and to acclimation of fish introduced into aquariums.

Fish, and marine livestock in general, generally become acclimated to the water they live in. Factors including temperature, pH, and specific gravity (salinity) are all part of the environment a fish becomes use to and even slight differences in these factors can result in shock and stress. Such shock and stress may be detrimental to health and a long life.

Unfortunately, when a fish is purchased and introduced to an owner's aquarium, the temperature, pH, and specific gravity in the aquarium is rarely exactly the same as what the fish has adapted to. Apparatus and methods are available to ease the transition from the prior environment to the new home, but these are often either difficult to use and imprecise. As a result, the fish may experience both shock and stress even when the owner takes steps to ease the transition.

BRIEF SUMMARY OF THE INVENTION

The present invention addresses the above and other needs by providing an aquarium acclimation device and method which reduce stress and shock which may occur during transition of marine livestock including fish, invertebrates, corals, etc., from a store, online, or wholesaler, to an owner's aquarium. The acclimation device includes tubing, a squeeze bulb, a drip counter, and a rolling clamp. A "J" tube is hung over an edge of the aquarium with one end reaching into water in the aquarium and an opposite end hanging outside the aquarium. The squeeze bulb is connected to the outside end of the "J" tube for initiation of a flow of the aquarium water from the aquarium and a clear squeeze bulb may further provide the drip counter. The rolling clamp and drip counter allow a gradual, observable, and controlled flow for a gradual controlled transition to the aquarium environment.

In accordance with one aspect of the invention, there is provided an aquarium acclimation device and method including a squeeze bulb to initiate a flow from an aquarium into an acclimation bowl. The squeeze bulb may further be a clear squeeze bulb allowing observation of the flow rate into the acclimation bowl.

In accordance with another aspect of the invention, there is provided an aquarium acclimation device and method including a rolling clamp. The rolling clamp is positioned over non-ridged tubing carrying aquarium water into the acclimation bowl. The rolling clamp may be adjusted to control the rate of addition of aquarium water into the acclimation bowl. The combination with the clear squeeze bulb provides a very simple and accurate method to control the rate of aquarium water transfer to the accumulation bowl.

In accordance with another aspect of the invention, there is provided an aquarium acclimation method. The method includes assembling an acclimation system and using the acclimation system. Assembling an acclimation system includes the steps of hanging a rigid J tube on edge of an aquarium with one end of the J tube submerged in aquarium water, attaching a first end of a first tube to an outside end of the J tube, attaching a first end of a squeeze bulb to a second end of the first tube, attaching a first end of a second tube to a second end of the squeeze bulb, wherein the second tube in non-ridged, positioning an acclimation bowl to have a water level below the water level in the aquarium; and placing a second end of the second tube in the acclimation bowl. Using the acclimation system includes the steps of blocking the flow through the second tube, squeezing and releasing the squeeze bulb to draw aquarium water into the acclimation system, and releasing the blocking of the second tube to start a flow of water from the aquarium into the acclimation bowl. The method further preferably includes observing the rate of flow of water into the acclimation bowl and adjusting the flow to a desired flow. A preferred method for controlling the flow includes positioning an adjustable clamp over the second tube and observing the rate of flow of water into the acclimation bowl and adjusting the clamp to obtain a desired flow. Preferably, the squeeze bulb is a clear squeeze bulb, and a drip rate may be observed in the clear squeeze bulb and clamp adjusted to obtain a desired flow based on the observed drip rate.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
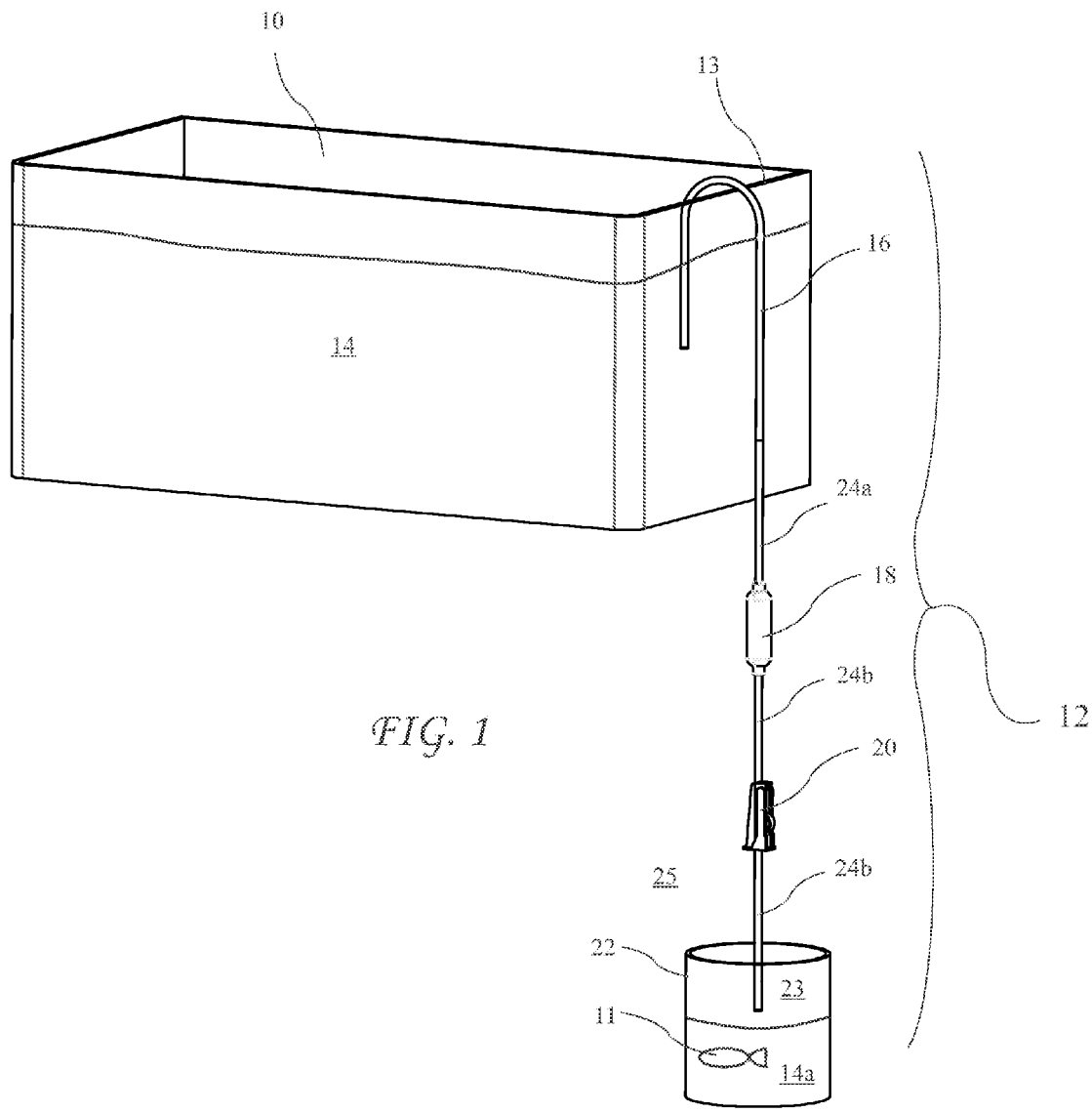
FIG. 1 shows an aquarium and acclimation system according to the present invention.

An aquarium 10 and acclimation system 12 according to the present invention are shown in FIG. 1. The aquarium 10 contains aquarium water 14 having a specific temperature, pH, and specific gravity (salinity). The acclimation system 12 includes a J tube 16, tube 24a attached to the J tube 16, a squeeze bulb 18 attached to the tube 24a, a non-ridged tube 24b attached to the opposite end of the squeeze bulb 18, and a clamp 20 residing over the non-ridged tube 24b. The J tube 16 is preferably sufficiently ridged to hang over a top edge 13 of the aquarium 10 and retain shape and remain in place, and the tube 24a is preferably non-ridged and selected to slide over a tapered end of the J tube 16 to connect the squeeze bulb 18 to the J tube 16. The acclimation system 12 provides a path for the aquarium water 14 into an acclimation bowl 22 (e.g., a small fish bowl, a bucket, or the like) having an interior 23 containing acclimation water 14a open to an area 25 surrounding the accumulation bowl 22.

Figure 2:
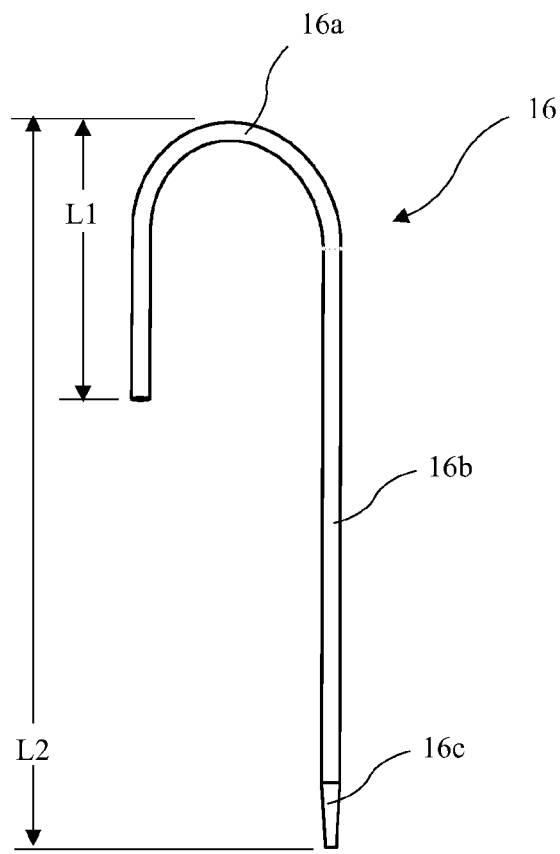
FIGS. 2-4 show the elements of the acclimation system according to the present invention.
Figure 3:
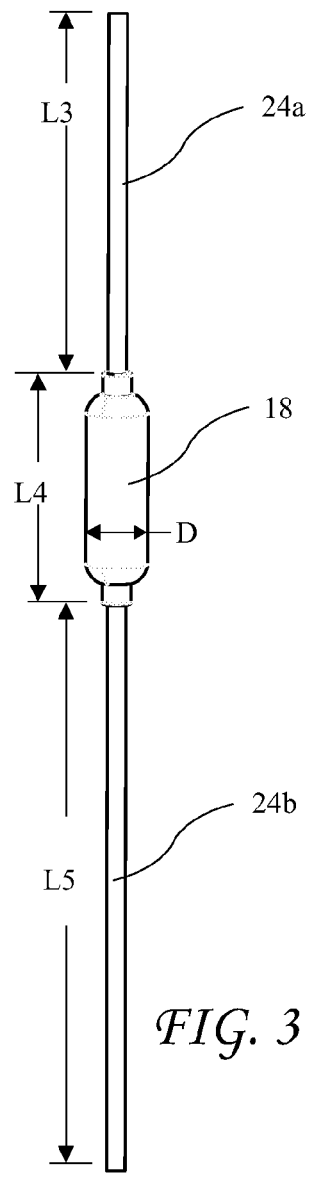
Figure 4:
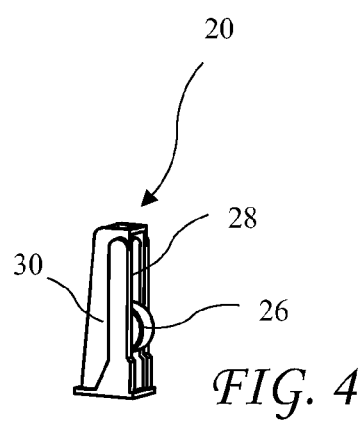

FIGS. 2-4 shows the elements of the acclimation system 12. The J tube 16 is made of a material sufficiently ridged to maintain shape when hung over the edge of the aquarium 10 and not pinch or collapse to restrict the flow of aquarium water. A short hooked portion 16a has a length L1 reaching down into the aquarium 10 and a longer outside leg 16b having a length L2 and a tapered end 16c. The length L1 is preferably at least 60 mm and more preferably about 120 mm, and the length L2 is preferably about 240 mm.

The tube 24a has a length L3, the squeeze bulb 18 has a length L4 and a diameter D and a volume V, and the tube 24b and a length L5. The length L3 is preferably about 160 mm, the length L4 is preferably about 64 mm, the diameter D is preferably about 17 mm, the volume V is preferably between 5 ml and 20 ml for convenient use, and more preferably about 10 ml, and the length L5 is preferably about 1,300 mm. The tube 24a is preferably a flexible tube allowing the tube 24a to be pushed onto the tapered end 16c of the J tube 16. The tube 24b is preferably a flexible tube allowing the use of the clamp 20 to squeeze the tube 24b to control the rate of flow of aquarium water into the acclimation bowl 22.

A functional requirement is that the volume V of the squeeze bulb 18 is sufficient to draw enough aquarium water into the J tube to initiate a syphoning action when any restrictions to flow through the acclimation system 12 are removed. This is equivalent to filling the J tube or combination of the J tube and tube 24a to a depth below the surface of the aquarium water in the aquarium.

The clamp 20 is preferably a rolling clamp having a roller 26 moveable in slots 28 in a housing 30.

Figure 5A:
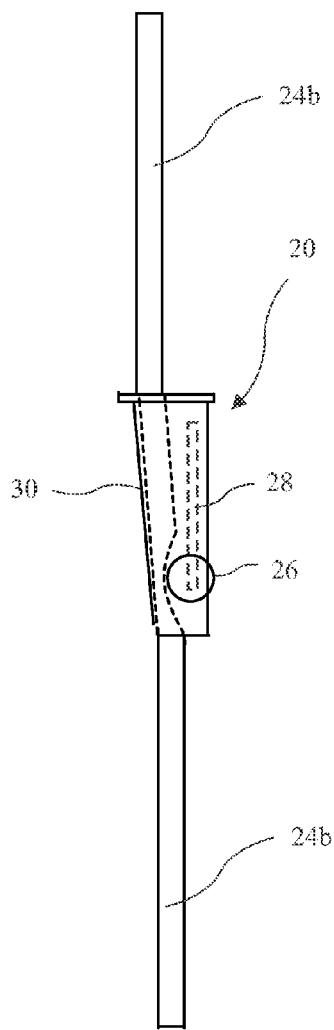
FIGS. 5A and 5B show the operation of a rolling clamp according to the present invention.
Figure 5B:
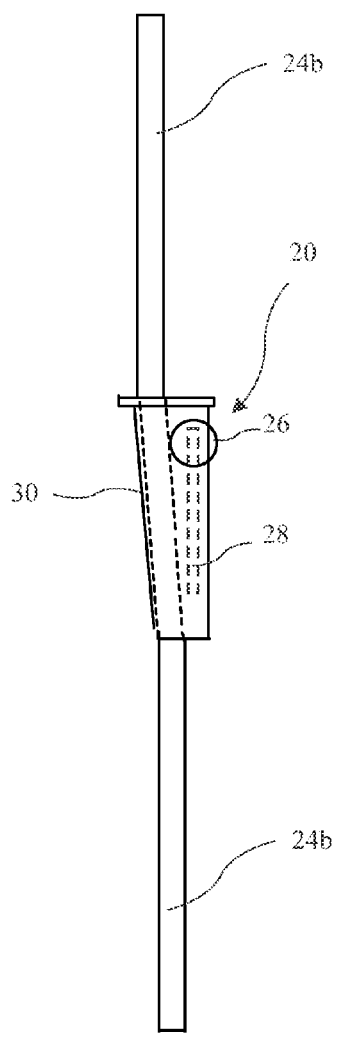

The operation of a rolling clamp 20 is shown in FIGS. 5A and 5B. In a closed position shown in FIG. 5A, the roller 26 collapses the tube 24b to restrict or prevent the flow of aquarium water into the acclimation bowl 22. In the open position shown in FIG. 5B, the flow of aquarium water is not restricted. The roller clamp 20 resides generally centered over the tubes 22b without breaching the tube 22b (i.e., not creating a hole or gap in or break through the tube 22b).

Figure 6:
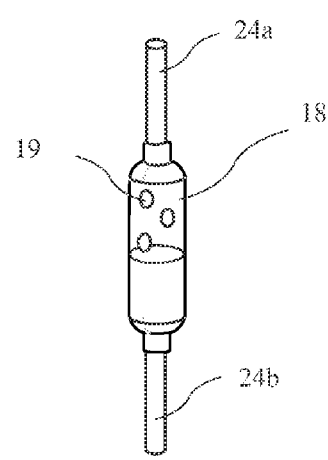
FIG. 6 shows a clear squeeze bulb according to the present invention.
Figures 7, 8:
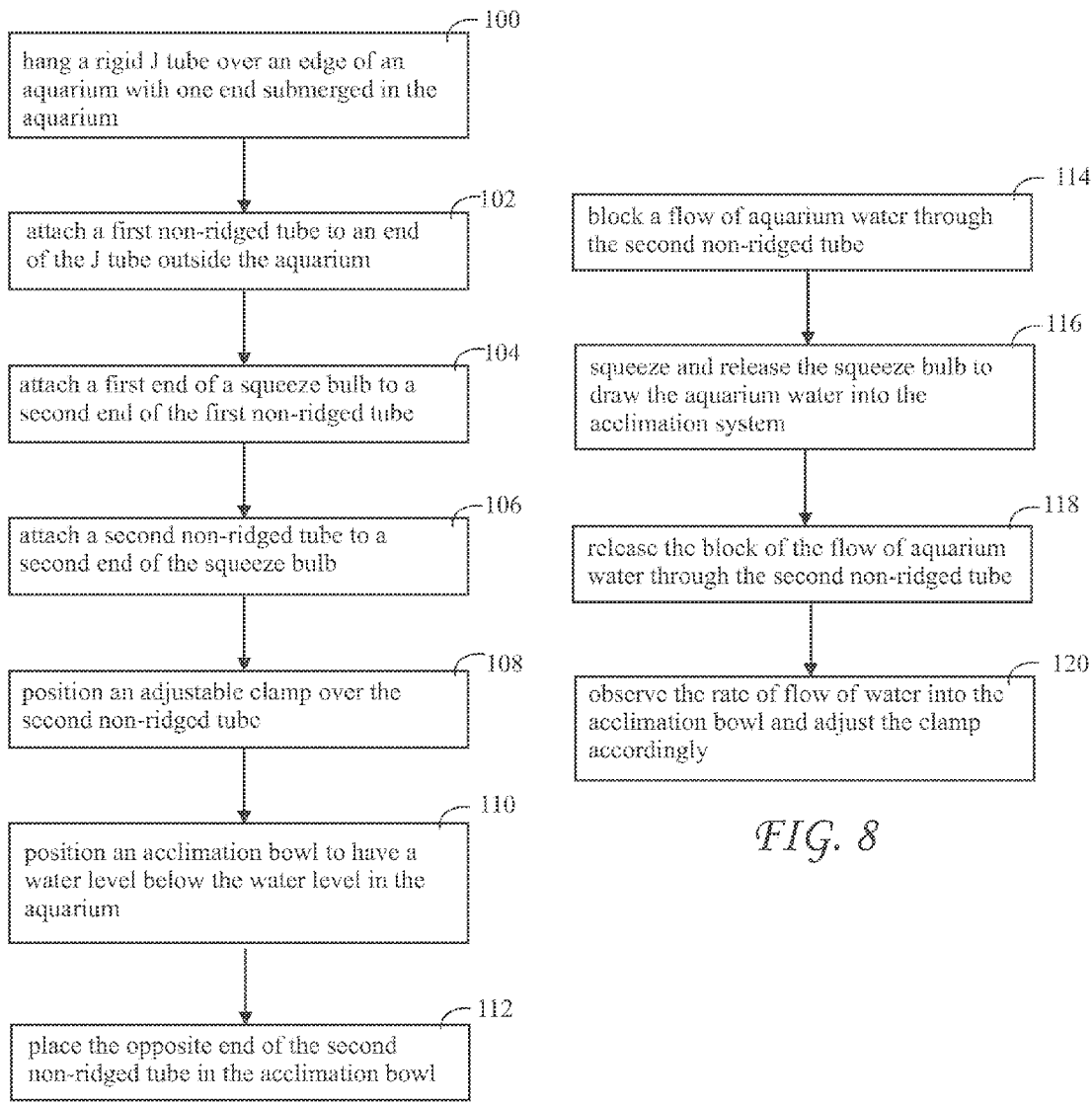
FIG. 7 is a method for setting up the acclimation system according to the present invention.
FIG. 8 is a method for using the acclimation system according to the present invention.

A clear squeeze bulb 18 is shown in FIG. 6. Drops 19 of aquarium water are visible in the clear squeeze bulb 18 allowing the user to easily observe the rate of flow of aquarium water into the acclimation bowl 22. Preferred rates of flow of the aquarium water are:

1-2 drips per second—for snails, shrimps, crabs, starfish, anemones;

2-3 drips per second—for wrasses, puffers, anthias, gobies, butterflies; and 3-4 drips per second—for majority of other fish such as angels, tangs, corals A method for setting up the acclimation system 12 according to the present invention is shown in FIG. 7. The method includes: hanging a rigid J tube over an edge of an aquarium with one end of the J tube submerged in aquarium water at step 100; attaching a first non-ridged tube to an end of the J tube outside the aquarium at step 102; attaching a first end of a squeeze bulb to a second end of the first non-ridged tube at step 104; attaching a second non-ridged tube to a second end of the squeeze bulb at step 106; positioning an adjustable clamp over the second non-ridged tube at step 108; positioning an acclimation bowl to have a water level below the water level in the aquarium at step 110; and placing a second end of the second non-ridged tube in the acclimation bowl at step 112. While a first non-ridged tube is preferred, a ridged tube may be used.

A method for using the acclimation system 12 according to the present invention is shown in FIG. 8. The method includes: blocking a flow of aquarium water through the second non-ridged tube at step 114; squeezing and releasing the squeeze bulb to draw the aquarium water into the acclimation system at step 116; releasing the block of the flow of aquarium water through the second non-ridged tube at step 118; and observing the rate of flow of water into the acclimation bowl and adjust the clamp accordingly.

A method for cleaning the acclimation system 12 includes hanging the J tube over the edge of a container containing fresh water and cycling the fresh water through the acclimation system 12.

While the invention herein disclosed has been described by means of specific embodiments and applications thereof, numerous modifications and variations could be made thereto by those skilled in the art without departing from the scope of the invention set forth in the claims.

I claim:

1. A method for aquarium acclimation, the method comprising:
    assembling an acclimation system comprising the steps of:
        hanging a rigid J tube on a top edge of an aquarium with an inside end of the J tube submerged into aquarium water in the aquarium in unrestricted communication with the aquarium water;
        attaching a first end of a non-rigid first tube to an outside end of the J tube;
        attaching a first end of a clear squeeze bulb to a second end of the first tube;
        attaching a first end of a non-rigid second tube to a second end of the clear squeeze bulb;
    positioning an adjustable clamp over the second tube, the second tube entering, passing through the entire adjustable clamp, and extending beyond the adjustable clamp, without breaching the second tube;
    positioning an open top acclimation bowl outside the aquarium and to have a water level below the water level in the aquarium, an interior of the acclimation bowl partially filled with water containing at least one marine livestock, and the interior of the accumulation bowl open to fluid communication through an open top of the accumulation bowl with an area around the accumulation bowl; and
        placing a second end of the second tube in the acclimation bowl while leaving the adjustable clamp above an acclimation bowl water level; and
    using the acclimation system comprising the steps of:
        blocking a flow through the second tube;
        squeezing and releasing the clear squeeze bulb to draw the aquarium water into the acclimation system;
        releasing the blocking of the second tube to start the flow of the aquarium water from the aquarium into the acclimation bowl;
        observing a drip rate of flow of water in the clear squeeze bulb;
        adjusting the adjustable clamp to obtain the desired observed drip rate in the clear squeeze bulb without breaching the second tube; and
        leaving the interior of the accumulation bowl, residing outside the aquarium, in fluid communication through the open top of the accumulation bowl with the area around the accumulation bowl until the acclimation is completed.

2. The method of claim 1, wherein adjusting the clamp to obtain the desired flow comprises adjusting the clamp to obtain the flow between one and four drips per second.

3. The method of claim 1, wherein attaching the first end of the clear squeeze bulb to the second end of the first tube comprises attaching the first end of the clear squeeze bulb having a volume between 5 ml and 20 ml to the second end of the first tube.

4. The method of claim 3, wherein attaching the first end of the clear squeeze bulb to the second end of the first tube comprises attaching the first end of the clear squeeze bulb having a volume of about 10 ml to the second end of the first tube.

5. The method of claim 1, wherein:
positioning the open top acclimation bowl to have a water level below the water level in the aquarium comprises positioning the open top acclimation bowl containing marine life selected from the group consisting of snails, shrimps, crabs, starfish, and anemones to have a water level below the water level in the aquarium, and further including:
observing the flow rate of water into the open top acclimation bowl and adjusting the clamp to obtain the flow rate of one to two drips of water per second.

6. The method of claim 1, wherein:
positioning the open top acclimation bowl to have a water level below the water level in the aquarium comprises positioning the open top acclimation bowl containing marine life selected from the group consisting of wrasses, puffers, anthias, gobies, and butterflies to have a water level below the water level in the aquarium, and further including:
observing the flow rate of water into the open top acclimation bowl and adjusting the clamp to obtain the flow rate of two to three drips of water per second.

7. The method of claim 1, wherein:
positioning the open top acclimation bowl to have a water level below the water level in the aquarium comprises positioning the open top acclimation bowl containing marine life selected from the group consisting of angels, tangs, and corals to have a water level below the water level in the aquarium, and further including:
and
observing the flow rate of water into the open top acclimation bowl and adjusting the clamp to obtain the flow rate of three to four drips of water per second.

8. The method of claim 1, wherein the rigid J tube has a short hooked portion extending down into the aquarium a length (L1) from a peak of the rigid J tube, and the length (L1) is at least 60 mm.

9. The method of claim 8, wherein the length (L1) is about 120 mm.

10. A method for aquarium acclimation, the method comprising:
providing an acclimation bowl partially filled with acclimation water and containing marine life;
assembling an acclimation system comprising the steps of:
hanging a rigid J tube on a top edge of an aquarium with an inside end of the J tube submerged into aquarium water in the aquarium, the rigid J tube has a short hooked portion extending down into the aquarium a length (L1) from a peak of the rigid J tube, and the length (L1) is at least 60 mm;
attaching a first end of a first non-rigid tube to an outside end of the J tube;
attaching a first end of a clear squeeze bulb to a second end of the first tube;
attaching a first end of a second non-rigid tube to a second end of the clear squeeze bulb, wherein the second tube is non-ridged;
positioning an adjustable clamp over the second tube, the second tube entering, passing through the entire adjustable clamp, and extending beyond the adjustable clamp, without breaching the second tube;
positioning the acclimation bowl outside the aquarium and to have a water level below the water level in the aquarium; and
placing a second end of the second tube in the acclimation bowl while leaving the adjustable clamp above an acclimation bowl water level; and
using the acclimation system comprising the steps of:
blocking a flow through the second tube;
squeezing and releasing the clear squeeze bulb to draw the aquarium water into the acclimation system;
releasing the blocking of the second tube to start the flow of the aquarium water from the aquarium into the acclimation bowl;
selecting a drip rate based on the type of the marine life present in the acclimation bowl;
observing a drip rate in the clear squeeze bulb;
adjusting the adjustable clamp to obtain the selected drip rate based on the observed drip rate; and
leaving the interior of the accumulation bowl, residing outside the aquarium, in fluid communication through the open top of the accumulation bowl with the area around the accumulation bowl until the acclimation is completed.

11. A method for aquarium acclimation, the method comprising:
providing an acclimation bowl;
assembling an acclimation system comprising the steps of:
hanging a rigid J tube on an edge of an aquarium with an inside end of the J tube submerged into aquarium water in the aquarium in unrestricted communication with the aquarium water;
attaching a first end of a first non-rigid tube to an outside end of the J tube;
attaching a first end of a clear squeeze bulb to a second end of the first tube;
attaching a first end of a second non-rigid tube to a second end of the clear squeeze bulb, wherein the second tube is non-ridged;
positioning an adjustable clamp over the second tube, the second tube entering, passing through the entire adjustable clamp, and extending beyond the adjustable clamp, without breaching the second tube;
positioning the acclimation bowl outside the aquarium and to have a water level below the water level in the aquarium; and
placing a second end of the second tube in the acclimation bowl while leaving the adjustable clamp above an acclimation bowl water level; and
using the acclimation system comprising the steps of:
blocking a flow through the second tube;
squeezing and releasing the clear squeeze bulb to draw the aquarium water into the acclimation system;
releasing the blocking of the second tube to start the flow of the aquarium water from the aquarium into the acclimation bowl;
selecting a drip rate of:
one to two drips per second for snails, shrimps, crabs, starfish, and anemones;
two to three drips per second for wrasses, puffers, anthias, gobies, and butterflies; or
three to four drips per second for angels, tangs, corals;
observing a drip rate in the clear squeeze bulb;
adjusting the adjustable clamp to obtain the selected drip rate based on the observed drip rate; and
leaving the interior of the accumulation bowl, residing outside the aquarium, in atmospheric fluid communication through the open top of the accumulation bowl with the area surrounding the accumulation bowl until the acclimation is completed.

12. The method of claim 1, wherein the adjustable clamp comprises a roller clamp residing over the second tube without breaching the second tube.

13. The method of claim 12, wherein adjusting the clamp comprises rolling a roller of the clamp along a slot in a housing, the slot diverging from the second tube at one end of the slot and converging towards the second tube at an opposite end of the slot, the roller collapsing the tube when the roller is rolled towards the opposite end of the slot to reduce flow through the second tube without breaching the second tube.

14. The method of claim 12, wherein the roller clamp is generally centered on the second tube.

15. The method of claim 1, wherein the inside end of the J tube resides about 120 mm below the top edge of the aquarium.

16. The method of claim 1, wherein the clear squeeze bulb has a volume V sufficient to expel sufficient air from the J tube and the first tube into the aquarium and to draw aquarium water from the aquarium into the first tube and second tube to sufficiently begin siphoning.

17. The method of claim 1, wherein the clear squeeze bulb has a volume V sufficient to expel sufficient air from the J tube and the first tube into the aquarium and to draw aquarium water from the aquarium into the first tube and second tube down to a level below the aquarium water line.

18. The method of claim 1, wherein the J tube reaches about 240 mm below the edge of the aquarium, the first tube reaches about 160 mm below the J tube, and the clear squeeze bulb is connected to the second end of the first tube.

19. The method of claim 1, wherein the clear squeeze bulb resides about 400 mm below an edge of the aquarium.

* * * * *